(12) United States Patent
Szefi (10) Patent No.: US 10,435,150 B1
(45) Date of Patent: Oct. 8, 2019

(54) PNEUMATICALLY ACTUATED TRIM TAB SYSTEM ON A ROTATING BLADE

(71) Applicant: Joseph Szefi, State College, PA (US)

(72) Inventor: Joseph Szefi, State College, PA (US)

(*) Notice: Subject to any disclaimer, the term of this patent is extended or adjusted under 35 U.S.C. 154(b) by 173 days.

(21) Appl. No.: 15/727,735

(22) Filed: Oct. 9, 2017

Related U.S. Application Data (60) Provisional application No. 62/406,008, filed on Oct. 10, 2016.

(51) Int. Cl.
*B64C 27/72* (2006.01)
*B64C 27/473* (2006.01)
*B64C 27/58* (2006.01)

(52) U.S. Cl.
CPC ............ *B64C 27/72* (2013.01); *B64C 27/473* (2013.01); *B64C 27/58* (2013.01); *B64C 2027/7222* (2013.01)

(58) Field of Classification Search
None
See application file for complete search history.

(56) References Cited

U.S. PATENT DOCUMENTS

| | | | | |
|---|---|---|---|---|
| 4,858,304 A * | 8/1989 | Weldon | ................ | H02K 31/02 29/598 |
| 5,106,265 A * | 4/1992 | Holzem | ................ | F03D 7/0252 416/23 |
| 6,015,115 A * | 1/2000 | Dorsett | ................ | B64C 3/46 244/123.11 |
| 6,234,751 B1 * | 5/2001 | Hassan | ................ | B64C 23/04 244/130 |
| 8,042,772 B2 * | 10/2011 | Lutke | ................ | B64C 3/46 244/123.11 |
| 8,393,576 B2 * | 3/2013 | Lutke | ................ | B64C 1/34 244/123.11 |
| 8,647,059 B1 * | 2/2014 | Szefi | ................ | B64C 27/72 416/1 |
| 8,727,280 B1 * | 5/2014 | Lutke | ................ | B64C 3/30 244/123.11 |
| 9,714,057 B2 * | 7/2017 | Smith | ................ | B62D 35/008 |
| 2010/0028149 A1 * | 2/2010 | Li | ................ | F03D 7/0228 416/91 |
| 2011/0217167 A1 * | 9/2011 | Hancock | ................ | F03D 1/0675 416/23 |

\* cited by examiner

*Primary Examiner* — Michael Lebentritt
(74) *Attorney, Agent, or Firm* — John J. Elnitski, Jr.

(57) ABSTRACT

A pneumatic actuated trim tab system adapted to be mounted on a rotor blade to pneumatically alter aerodynamic properties of the rotor blade. The system includes an inflatable diaphragm adapted to be mounted on one or each side of the rotor blade; a deformable plate attached to each of the inflatable diaphragm, such that inflation and deflation of the inflatable diaphragm causes movement of each of the plates; a valving system connected to each inflatable diaphragm to allow input of a fluid into each inflatable diaphragm and allow release of a fluid out of each inflatable diaphragm; and a controller for controlling fluid pressure into and out of each inflatable diaphragm using the valving system.

20 Claims, 9 Drawing Sheets

PNEUMATICALLY ACTUATED TRIM TAB SYSTEM ON A ROTATING BLADE

This application claims the benefit of and incorporates by reference U.S. Provisional Application No. 62/406,008 filed Oct. 10, 2016.

BACKGROUND

The present invention generally relates to actuating a moveable trim tab surface on an airfoil. More specifically, the present invention relates to actuating a moveable surface on a rotor blade using generated air pressure differentials that can be used to mimic the aerodynamic effects of a conventional trim tab surface.

Despite being fabricated to tight tolerances, helicopter rotor blades inevitably have slight manufacturing variations that cause lift and dynamic response to vary among blades. Moreover, these variations may change with time as the blade naturally wears during normal operation. In order to aerodynamically balance the blades, conventional trim tabs on the blade trailing edges are incrementally adjusted manually, introducing a large portion of rotorcraft maintenance time. It would be very advantageous if an active trim tab system was implemented that could automatically adjust trim tab angles during flight, which would greatly reduce overall helicopter vibration and maintenance time.

Various research efforts have been performed to develop an active trim tab system. There is an active trim tab actuator that uses shape memory alloy (SMA) material as the actuating mechanism. This approach, however, carries several risks with regard to operating in the rotor environment due to high force output requirements, high power efficiency requirements during actuation, and large temperature fluctuations. Also, special modifications are needed to achieve tab deflections held for long periods of time with little or no power consumption. Another approach utilizes a more traditional electromechanical actuator and a series of linkages to achieve tab motion. Despite reporting some promising results, the long term of effects of operating the actuator and linkages in very high centrifugal force remains untested and is likely to add significant design challenges.

Typically, other solutions for providing an actuator for trim tab actuation are too heavy to be practical, require excessive power, negatively increase rotor figure of merit by introducing suboptimal aerodynamic surfaces, cannot operate within the required temperature range, and require significant structural modifications to the rotor blade. In addition, the largest shortcoming of other designs is the inability to withstand the large centripetal accelerations found on rotor blades, particularly helicopter rotor blades. What is needed is a system that would provide a device that is a lightweight, actuated trim tab surface on rotor blades that contains no active outboard actuating elements, but instead contains internal actuating components that can locally actuate trim tab surfaces. It would further be advantageous to provide a retrofittable actuator system that can be mounted outboard on the rotor blade to actuate the trim tab surface.

It is an object of the present invention to provide actuation of a trim tab on a rotor blade using air pressure.

SUMMARY OF THE INVENTION

A pneumatic actuated trim tab system adapted to be mounted on a rotor blade to pneumatically alter aerodynamic properties of the rotor blade. The system includes an inflatable diaphragm adapted to be mounted on each side of the rotor blade; a deformable plate attached to each of the inflatable diaphragm, such that inflation and deflation of the inflatable diaphragm causes movement of each of the plate; a valving system connected to each inflatable diaphragm to allow input of a fluid into each of the inflatable diaphragm and allow release of a fluid out each of the inflatable diaphragm; and a controller for controlling fluid pressure into and out of each of the inflatable diaphragm using the valving system.

DETAILED DESCRIPTION

The present invention is embodiments of a pneumatic actuated trim tab system that are retrofittable on existing rotor blades, or can be designed into new rotor blade designs. These embodiments are lightweight, do not contain outboard actuating elements, do not require outboard rotor blade structural modifications if retrofitted, and therefore can be surface mounted without interrupting structural load paths. The embodiments include a valving system mounted at the blade root to control air flow into and out of actuating pressure diaphragms which act as actuators. The embodiments may also include a compressor system mounted at the blade root to control pressures to the actuating pressure diaphragms. The embodiments may also include surface mounted pneumatic channels that can be adhered to the rotor blade surface to pneumatically connect the valving system to outboard actuating pressure diaphragms. If the rotor blade is designed to incorporate the pneumatic actuated trim tab system, then pneumatic channels can be routed through the blade interior and concaved contours can be provided at the trim tab location, so that when the pneumatic actuated trim tab system is installed, the resulting overall blade contour is essentially equivalent to the originally intended blade contour.

Figure 1:
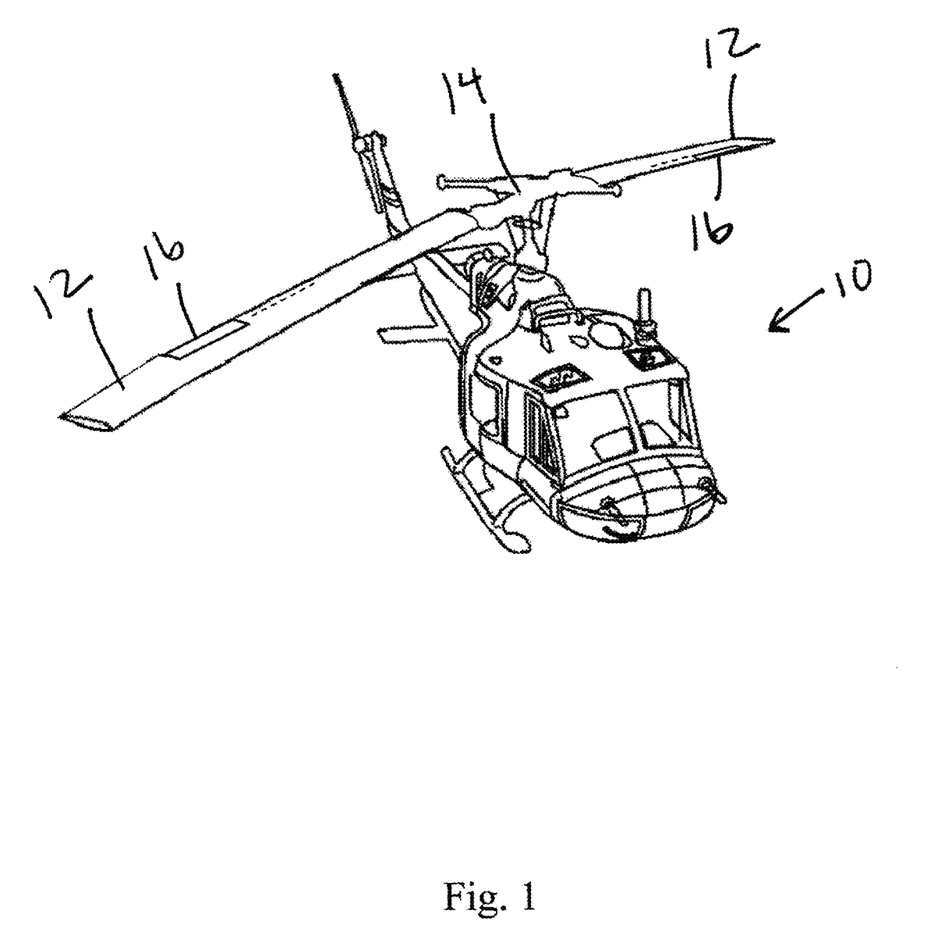
FIG. 1 is a perspective view of a helicopter with an active rotor blade surface according to the present invention.
Figure 2:
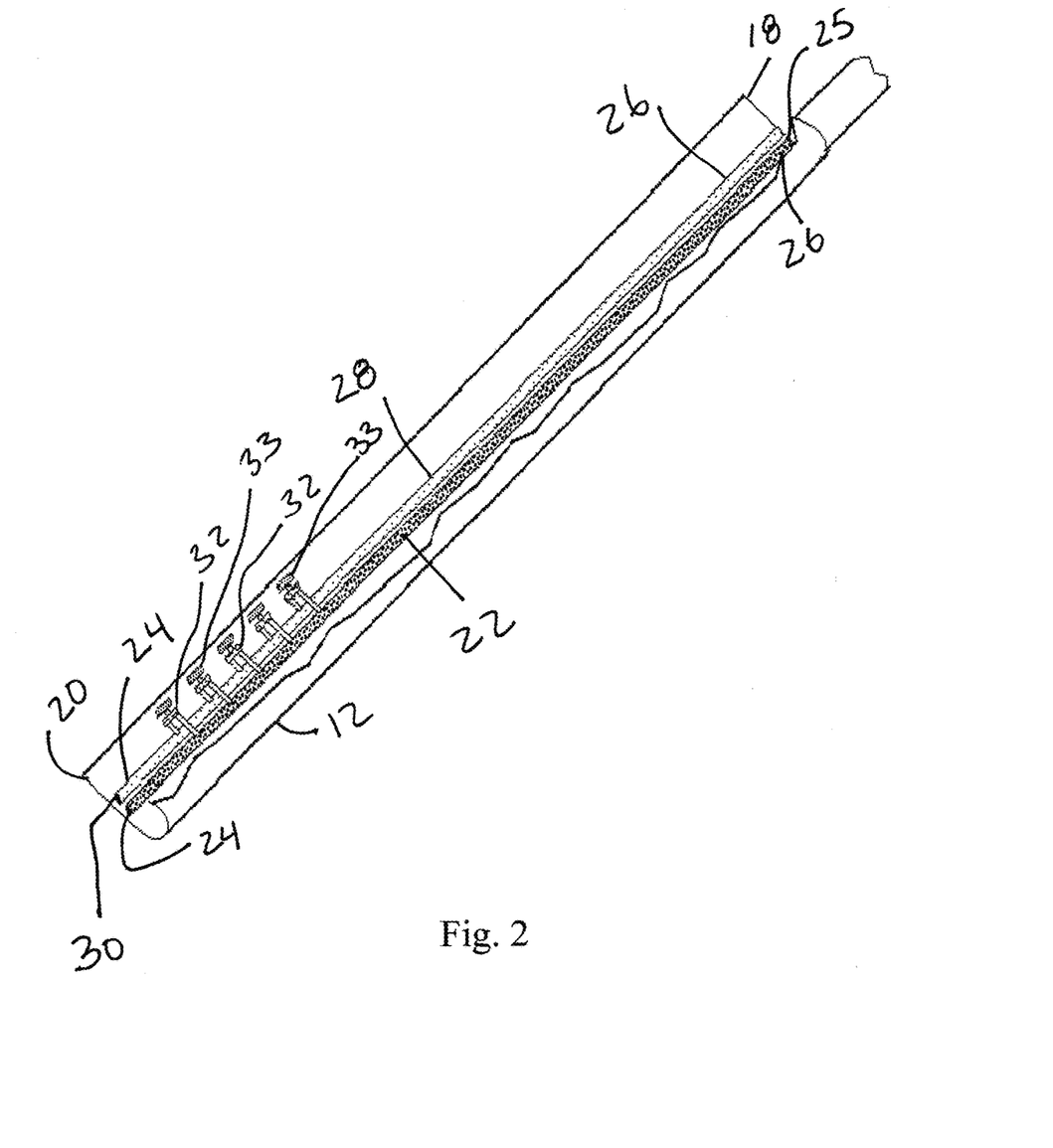
FIG. 2 is a perspective cutaway view of a rotor blade with a pneumatic actuator system according to the present invention.

The pneumatic actuated trim tab system can also use centrifugally generated air pressure differential from a rotor blade, in place of a compressor system. The centrifugally generated air pressure differential removes the need to supply an auxiliary pressure source at the rotor blade and allows the rotor blades to act as a pump to supply an air pressure differential for actuation of pneumatic actuators. The pneumatic actuator system uses a source of air pressure differentials associated with rotating rotor blades for device actuation or energy harvesting. The centrifugally generated air pressure differential uses separate volumes in the rotor blade that span a portion of the length of the interior of the rotor blade. During rotor blade rotation, one volume develops a relatively high pressure and the other volume develops a relatively low pressure when compared to the atmospheric pressure. FIG. 2 shows an example of a system that provides centrifugally generated air pressure differential. The rotor blade 12 of FIG. 2 includes a high pressure volume unit 22, which spans an internal portion of the length of the rotor blade 12 from the blade hub end 18 toward the blade tip 20. The high pressure volume unit 22 is shown as a sealed cylindrical tube with a unit tip end 24 and a unit hub end 26, but the high pressure volume unit 22 could be other shapes. The high pressure volume unit 22 includes an air inlet 25 at the unit hub end 26 which leads to the outside of the rotor blade 12. The air inlet 25 of the high pressure volume 22 is a small hole that is open to the atmosphere and is ideally located as close as possible to center of rotation of the rotor blade 12. The unit tip end 26 of the high pressure volume unit 22 that is closest to the blade tip 20 of the rotor blade 12 is sealed. During rotor blade 12 rotation, the high pressure volume unit 22 will develop an air pressure that is larger in absolute magnitude when compared to the outside atmospheric pressure due to centripetal acceleration of the air about the center of rotation of the rotor blade 12 at the rotor hub 14. During rotor blade rotation that induces the centrifugal forces, the pressure level within the high pressure volume unit 22 increases exponentially with increasing radial location from the unit hub end 26, with the highest pressure being located at the unit tip end 24. The rotor blade 12 of FIG. 2 includes a low pressure volume unit 28, which spans the internal portion of the length of the rotor blade 12 from the blade hub end 18 to the blade tip 20. The low pressure volume unit 28 is shown as a cylindrical tube with a unit tip end 24 and a unit hub end 26, but the low pressure volume unit 28 could be other shapes. The low pressure volume unit 28 includes an air outlet 30 at the unit tip end 24 that leads to the outside of the rotor blade 12. The air outlet 30 is a small hole that is open to the atmosphere and is ideally located as close as possible to the blade tip 20 of the rotor blade 12. The unit hub end 26 of the low pressure volume unit 28 that is closest to the center of rotation of the rotor blade 12 is sealed. During blade rotation, the low pressure volume unit 28 will develop a pressure that is smaller in absolute magnitude, when compared to the outside atmospheric pressure. The lower pressure is due to the air outlet 30 being exposed to a relatively low dynamic pressure created by the high tip velocity of the rotor blade 12 during rotation. During rotor blade rotation that induces the centrifugal forces, the pressure level within the low pressure volume unit 28 increases exponentially with increasing radial location from the unit hub end 26, with the highest pressure being located at the unit tip end 24. Both the high pressure volume unit 22 and low pressure volume unit 28 can be as simple as plastic tubing.

Figure 3:
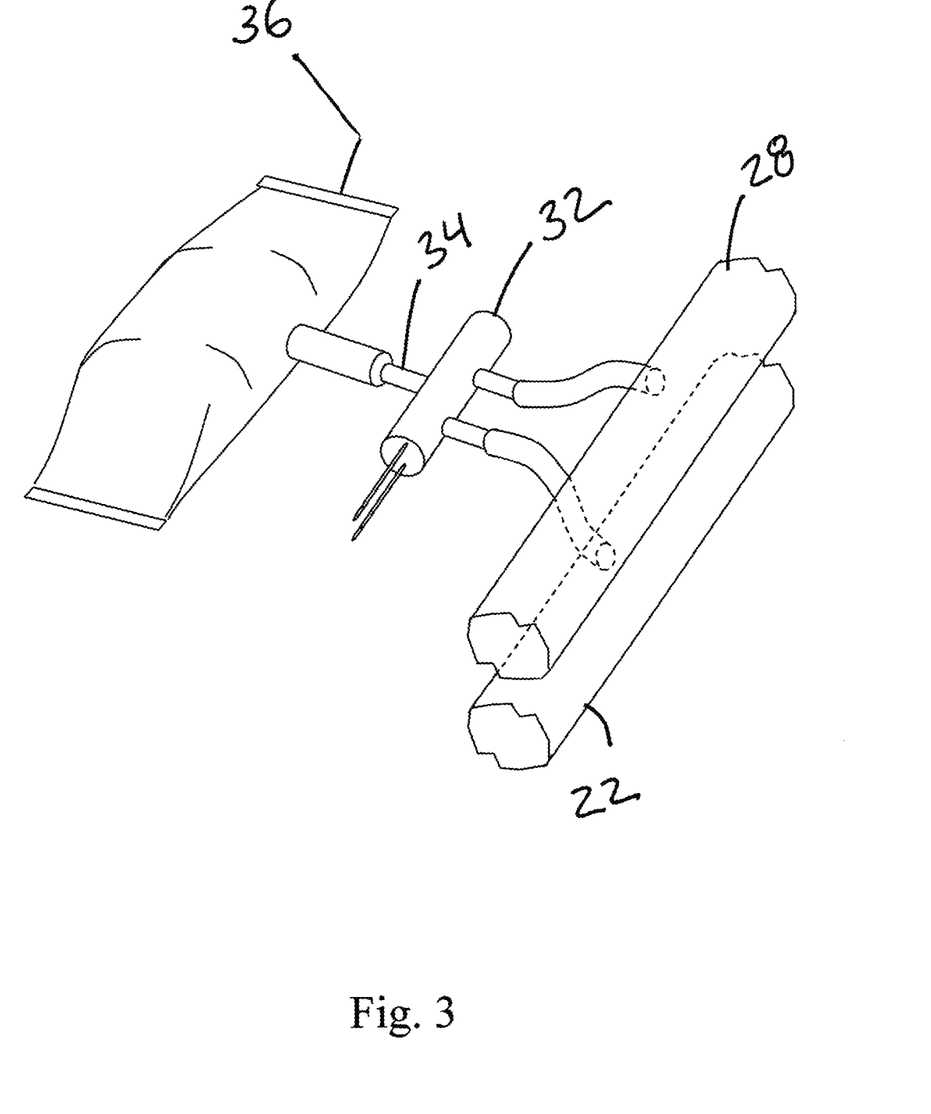
FIG. 3 is a perspective cutaway view of a pneumatic actuator system according to the present invention.
Figure 4:
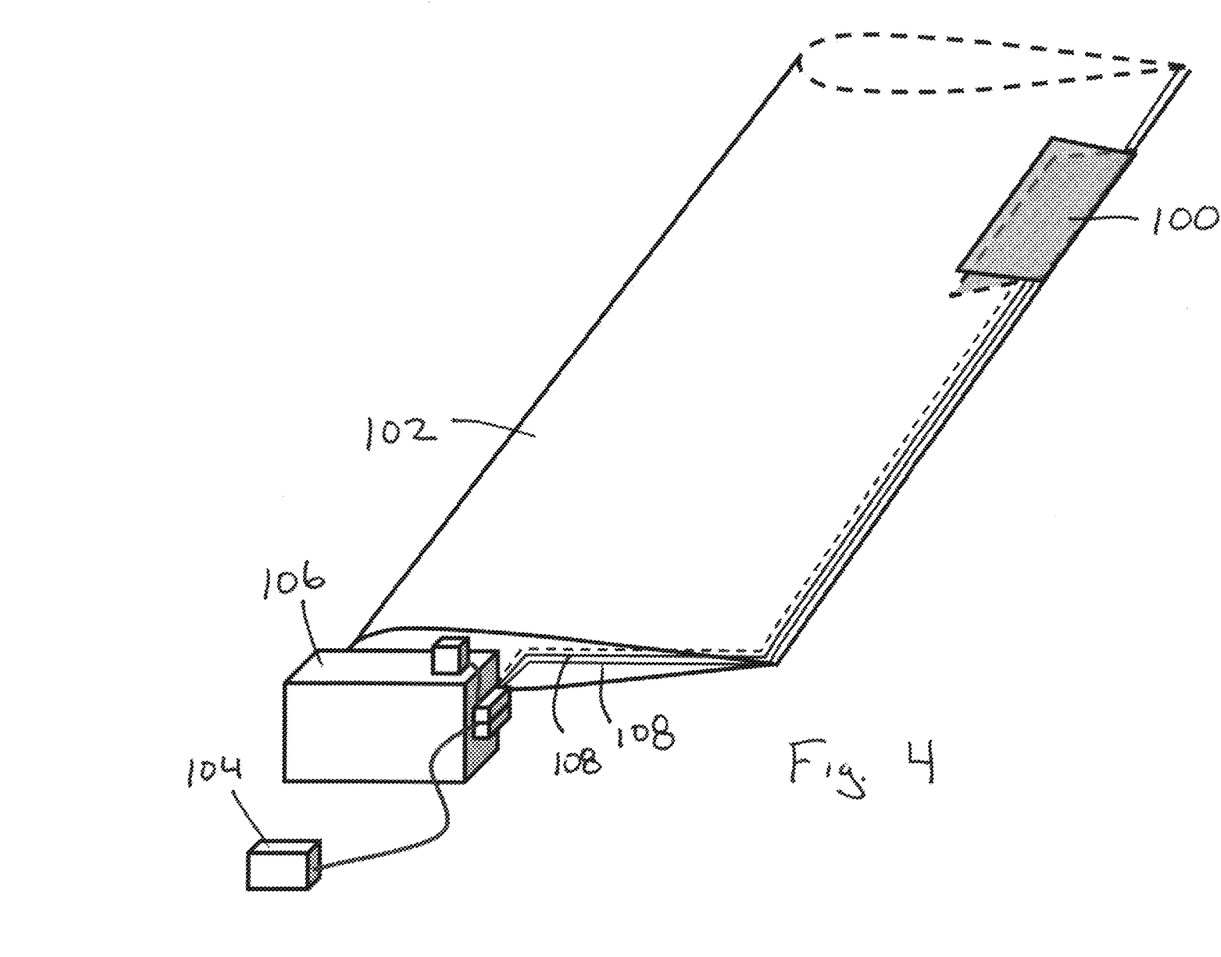
FIG. 4 is a perspective view of a rotor blade with pneumatic actuated trim tab system according to the present invention.
Figure 5:
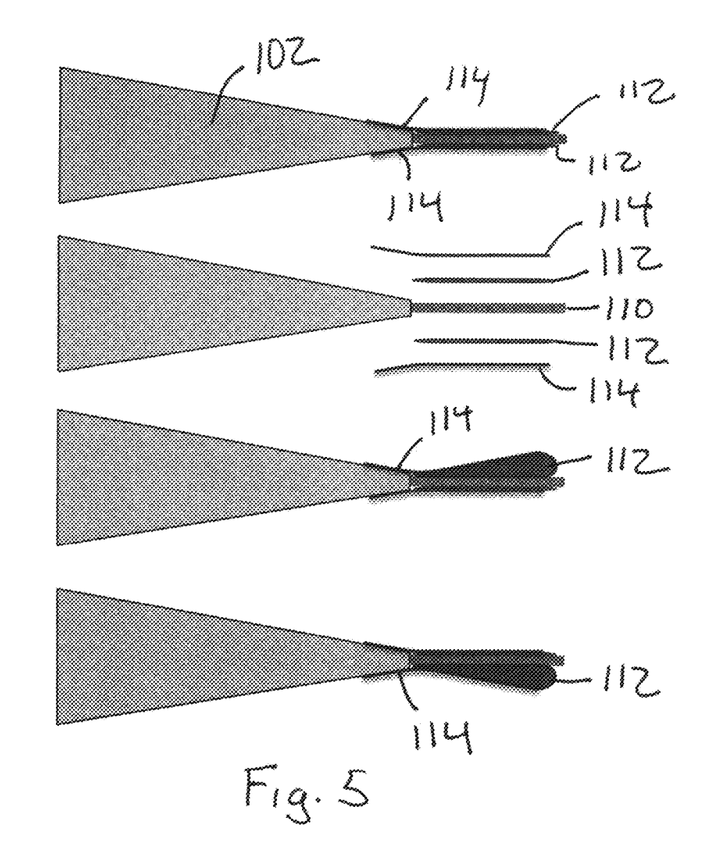
FIG. 5 is a sectional view of an embodiment of the pneumatic actuated trim tab system according to the present invention.

FIG. 2 shows an example valving using active valves to control actuation of the pneumatic actuated trim tab system. The valving can be used with a compressor system or the centrifugally generated air pressure differential system. Several active valves 32 as shown connect to the high pressure volume unit 22 along the length of the rotor blade 12, which act as sub outlets from the high pressure volume unit 22 to an actuator 33. FIG. 2 shows several active valves 32 connected to the low pressure volume unit 28 along the length of the rotor blade 12, which act as sub outlets to allow air to enter the low pressure volume unit 28 from an actuator 33. As shown in FIGS. 2-3, each active valve 32 is connected to both the high pressure volume unit 22 and the low pressure volume unit 28. The active valve 32 is a very small valve that can be controlled electrically to open and close. Not shown is an alternative embodiment of the present invention, where one or more active valves 32 are connected only to either the high pressure volume unit 22 or the low pressure volume unit 28. The active valves 32 may be one-way, two-way, three-way, or four-way type valves. The active valves 32 are connected such that the high pressure volume unit 22 is on one side of the valve passage of the active valve 32 and the low pressure volume unit 28 is on other side of the valve passage of the active valve 32 from the high pressure volume unit 22. The active valves 32 are electrically activated to open and close the valve passage in order to alter the direction of air flowing through the active valves 32. The direction of flow through the active valves 32 depends on the relative magnitude of the pressures of the high pressure volume unit 22 and low pressure volume unit 28 on either side of the valve passages that are open during blade rotation. An example of the active valve 32 is a miniature solenoid plunger type valve, however, any type of valve may be used that is capable of controlling air flow. FIG. 3 shows at least one outlet 34 of the active valve 32 connected to a pressure diaphragm 36, which is a volume that can change shape and not allow air to enter or escape, except through the active valve 32 connection. A pressure diaphragm is a form of an actuator. Changing the volume and pressure of the pressure diaphragm 36 to change its shape is used to move the active rotor blade surface 38 by filling or depleting air in the pressure diaphragm 36 using the pressure differential that exist between the high pressure volume unit 22 and the low pressure volume unit 28, as depicted in FIGS. 4-5. All of the air that used to change and fill the shape of the pressure diaphragm 36 is ingested through the air inlet 25. The air that exits to deplete the pressure diaphragm 36 is ultimately exhausted through the air outlet 30.

The embodiments of the pneumatic actuated trim tab system use pressure diaphragms as actuators to move actuator surfaces that mimic the aerodynamic effects of a conventional trim tab, as are shown in FIGS. 4-10. Each diaphragm is inflated or deflated with a fluid to move an actuator surface. The fluid is typically air. FIG. 4 is a perspective view of the overall pneumatic actuated trim tab system with all of the components, either optional or necessary. An actuator surface 100 to be actuated to mimic a conventional trim tab is shown on a rotor blade 102. The position of the actuator surface 100 is controlled by a microprocessor controller 104. The microprocessor controller 104 reads vibration data from vibration or acceleration sensors and then sends the appropriate control signals to the valving system 106. It is preferred that the pressures required to actuate the actuator surface be generated by centrifugal pumping, however, it is optional to provide augmented positive and/or negative pressures to the actuator surface using a miniature compressor system. The valving system 106 controls pressures using a pneumatic channel system connected to the inflatable diaphragm. The pneumatic channel system 108 can be either surface mounted or embedded within the airfoil of the rotor blade 102. Finally, by precisely controlling the pressures in the diaphragms, the pneumatic actuated trim tab system actively moves the actuator surface 100 that mimics the function of a conventional trim tab.

Figure 6:
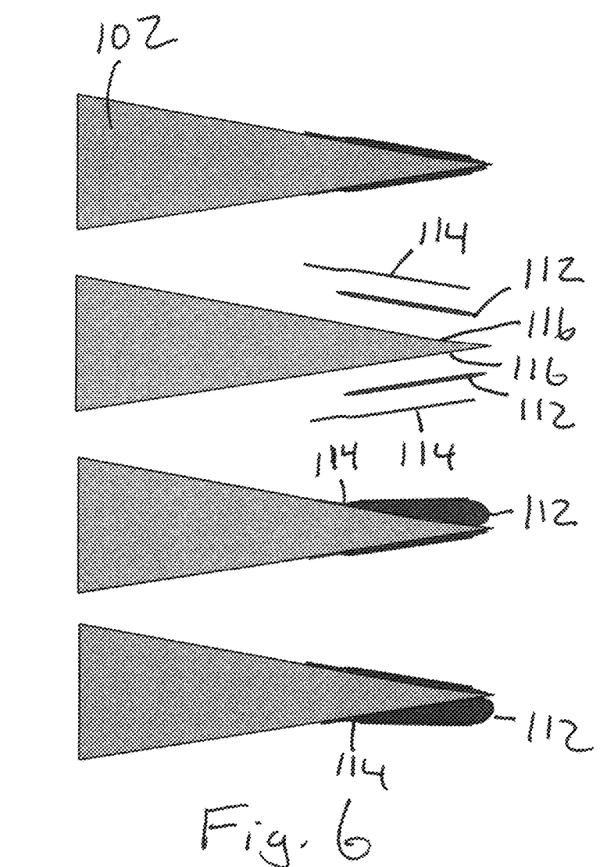
FIG. 6 is a sectional view of an embodiment of the pneumatic actuated trim tab system according to the present invention.

FIG. 5 shows a first embodiment of the pneumatic actuated trim tab system retrofitted on the rotor blade 102. FIG. 5 shows the rotor blade 102 with an existing trim tab 110. FIG. 5 shows an open end surface mounted wedge actuator on each side of the trim tab, so that there is an upper one and a lower one. Each actuator includes an inflatable diaphragm 112 adhered to the trim tab 110 and a thin, flexible protective plate 114 adhered to each of the inflatable diaphragms 112. The plate 114 acts as the actuator surface and rotates upward from the edge of the trim tab 110. The precise displacement of the plate 114 from the trim tab 110 can be controlled by controlling the pressure in the inflatable diaphragm 112. Movement of the upper plate 114 mimics movement of the trim tab 110 being move upward and movement of the lower plate 114 mimics movement of the trim tab 110 being move downward. FIG. 6 shows an embodiment with the open end surface mounted wedge actuator of FIG. 5 mounted directly on a trailing edge 116 of a rotor blade 102 without a trim tab. The open end surface mounted wedge actuators are mounted to the upper and lower surfaces of the rotor blade 102. In FIG. 6 movement of the upper plate 114 mimics movement of a trim tab 110 being move upward and movement of the lower plate 114 mimics movement of a trim tab 110 being move downward.

Figure 7:
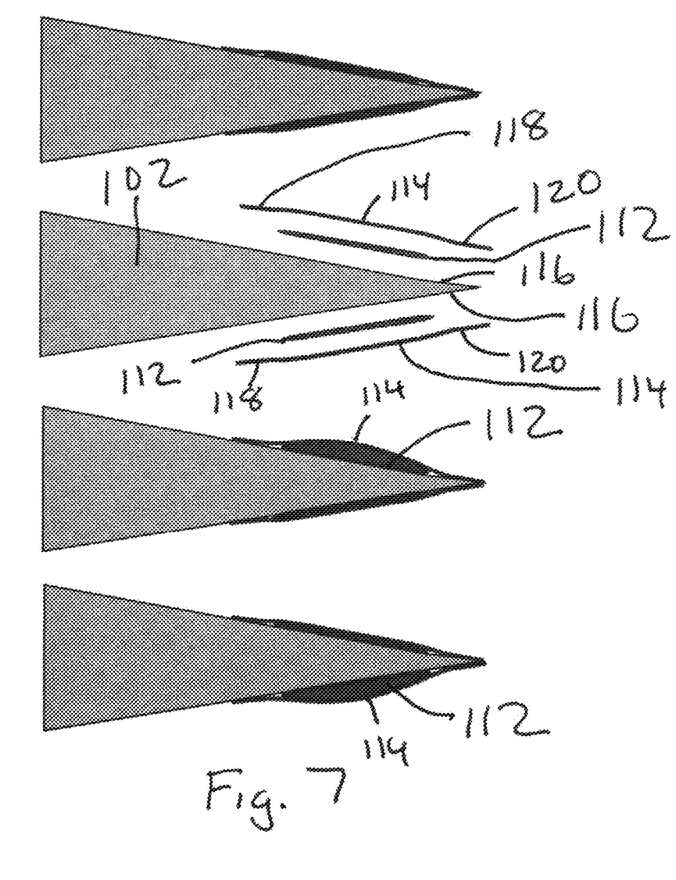
FIG. 7 is a sectional view of an embodiment of the pneumatic actuated trim tab system according to the present invention.

FIG. 7 shows an embodiment of with the inflatable diaphragms 112 adhered to each side of the trailing edge 116 of the rotor blade 102 similar to FIG. 6. A thin, flexible protective plate 114 is adhered to each inflatable diaphragm 112. The plate 114 is wide enough that the plate 114 includes a forward section 118 and rearward section 120 that both extend beyond the inflatable diaphragm 112. The forward section 118 and rearward section 120 are attached to the rotor blade 102, so that the inflatable diaphragm 112 is trapped between the plate 114 and the rotor blade 102. Inflating the inflatable diaphragm 112 causes the plate 114 to be activated to form a bump that yields less drag than the embodiments in FIGS. 5-6.

Figure 8:
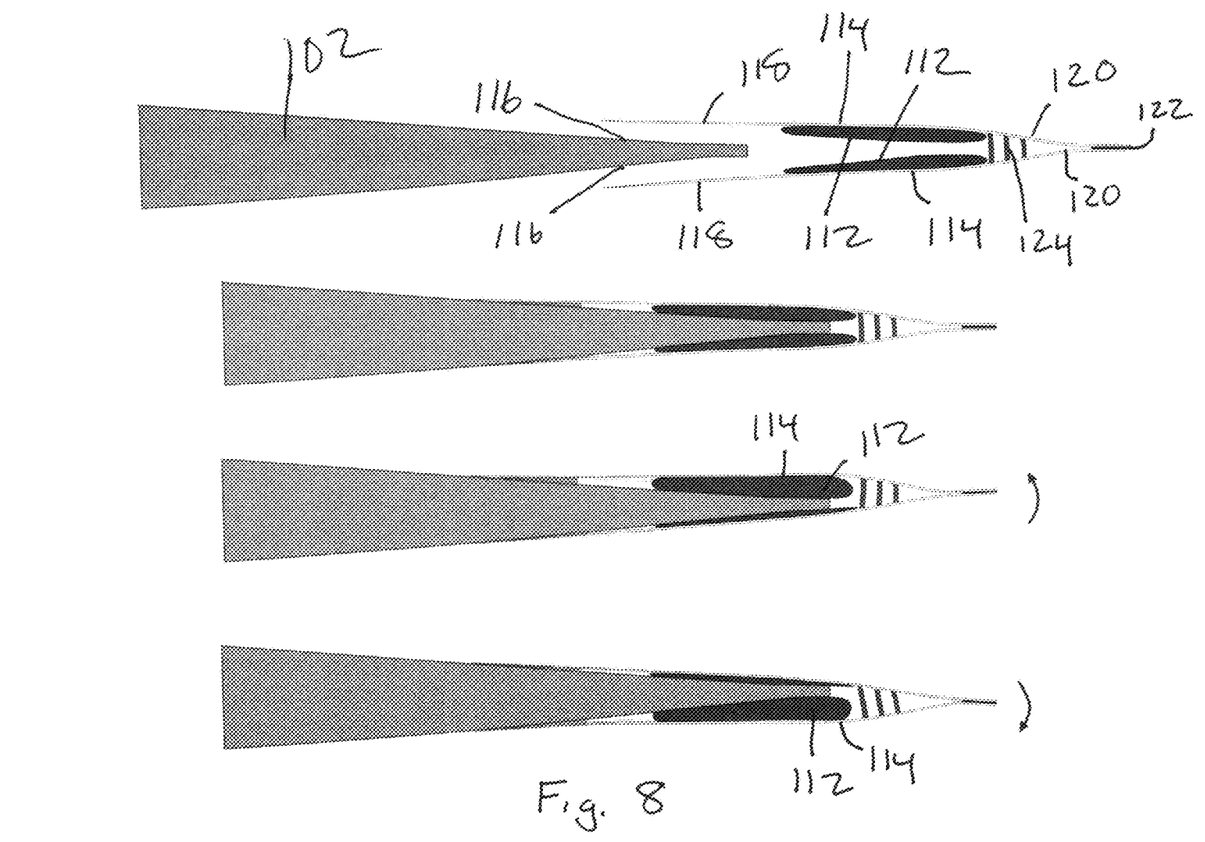
FIG. 8 is a sectional view of an embodiment of the pneumatic actuated trim tab system according to the present invention.

FIG. 8 shows an embodiment retrofitted to an existing rotor blade 102 where the plate 114 is wide enough that each plate 114 includes a forward section 118 and rearward section 120 that both extend beyond the inflatable diaphragm 112. Each inflatable diaphragm 112 is adhered to the bottom surface of each plate 114. The forward section 118 of each plate 114 is attached to the trailing edge 116 of the rotor blade 102, so that each inflatable diaphragm 112 contacts the trailing edge 116 of the rotor blade 102 and is trapped between the plate 114 and the rotor blade 102. The rearward sections 120 of the plates 114 meet together and are connected together by an elastomeric shear layer 122 sandwiched between the bottom surfaces of the plates 114 to allow bending. The plates 114 can be made of flexible carbon fiber. Included between the plates 114 are flexible ribs 124 that are stiffer in compression, yet allow the plates 114 to shear. In FIG. 8 inflation of the upper diaphragm 114 moves the upper plate 114 which moves the rearward section 120 of both plates 114 upward to mimic movement of a trim tab being move upward. Inflation of the lower diaphragm 112 moves the lower plate 114 which moves the rearward section 120 of both plates 114 downward to mimic movement of a trim tab being move downward. This embodiment maintains a smooth profile when deformed, as compared to the embodiment of FIG. 7.

Figure 9:
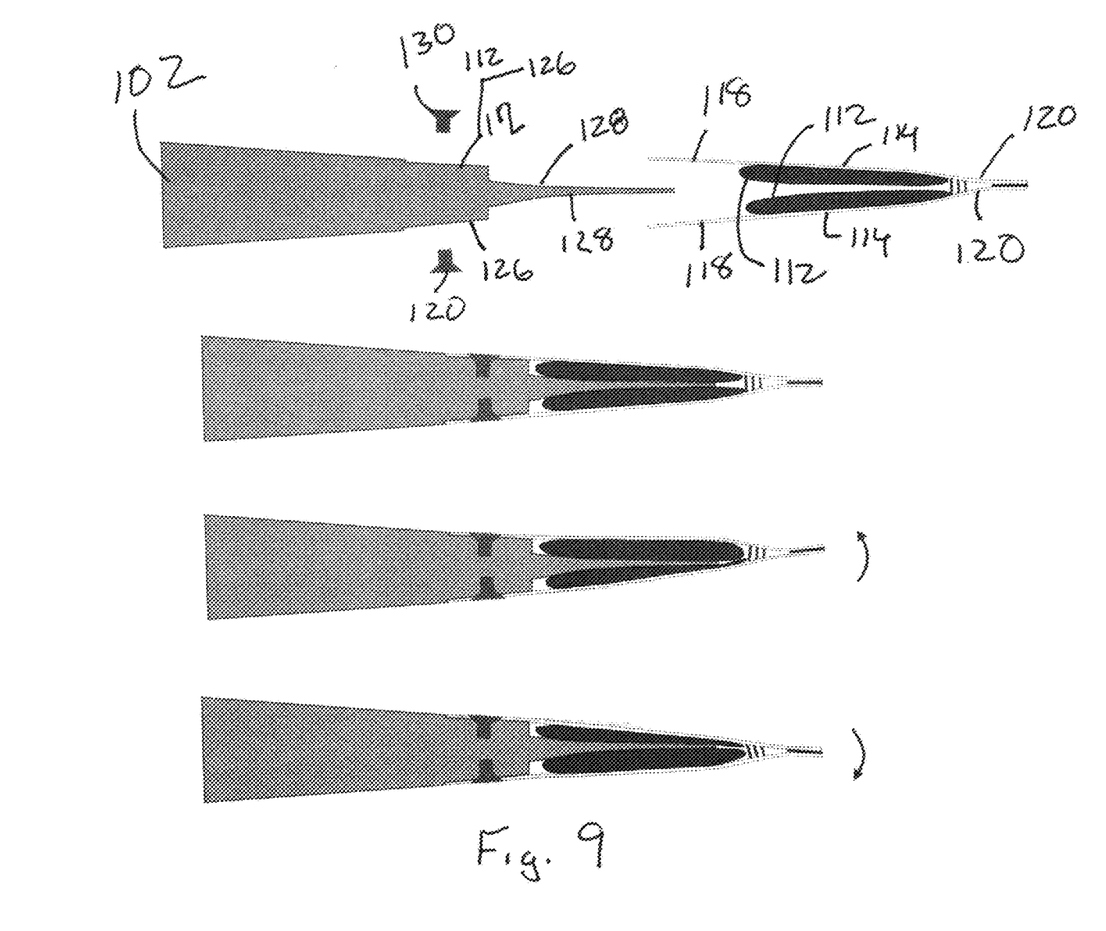
FIG. 9 is a sectional view of an embodiment of the pneumatic actuated trim tab system according to the present invention.

FIG. 9 shows an embodiment similar to FIG. 8 mounted to a new rotor blade profile. The upper side and lower side of the trailing edge 116 of the rotor blade 102 each include a plate recess 126 to receive the forward section 118 of each plate 114. The upper side and lower side of the trailing edge 116 of the rotor blade 102 each include a diaphragm recess 128 to receive each diaphragm 112. The forward section 118 is shown attached to the plate recess 126 using removable screws 130. The diaphragms 112 are shown resting between the plate 114 and the diaphragm recesses 128, where each diaphragm 112 is adhered to the bottom surface of the plates 114, but not to the rotor blade 102. Thereby, allowing for the system to be removable, but the forward sections 118 can also be adhered to the plate recesses 126. This embodiment allows for the original, intended blade profile and aerodynamics to be maintained, until the blade profile is morphed when the system is actuated.

Figure 10:
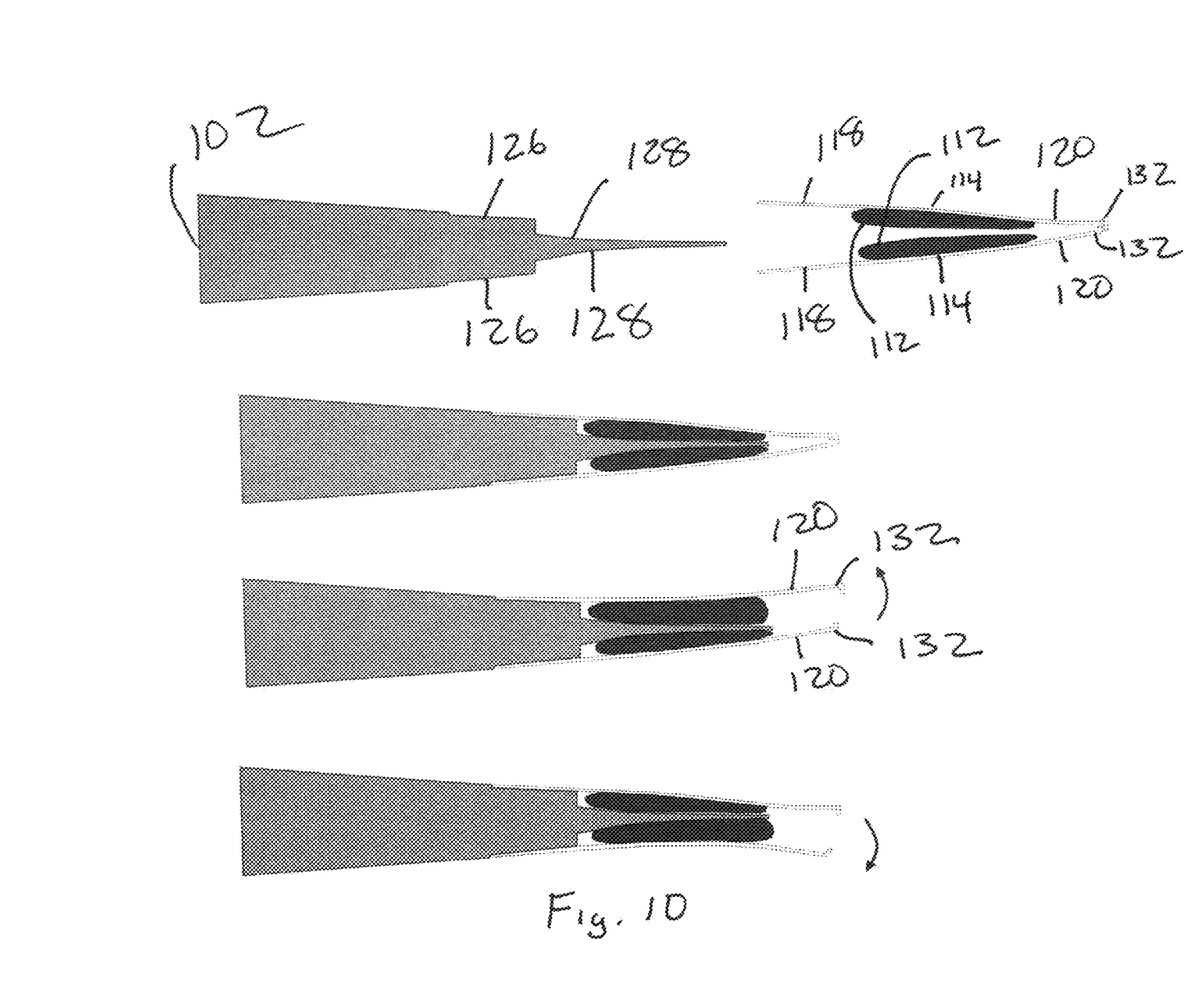
FIG. 10 is a sectional view of an embodiment of the pneumatic actuated trim tab system according to the present invention.

FIG. 10 shows an embodiment similar to the embodiment of FIG. 9. Where the difference is that the rearward sections 120 of the plates 114 are not connected. Each rearward end 132 of the rearward section 120 includes an L-shape trailing edge to increase spanwise stiffness and spanwise displacement uniformity. This allows for the plates 114 to be individually replaced without have to disconnect the plates 114 from each other. The plates 114 do separate from each other when one of the plates 114 is deployed.

For the embodiments shown in FIGS. 4-10 using centrifugal air pumping, the diaphragms can be connected differently as follows. A pneumatic line can connect the valves to the upper diaphragm and a separate pneumatic line can connect the valves to the lower diaphragm. The low pressure line spans from the valves to the blade tip to vent the relatively higher pressure in either diaphragm to the low dynamic pressure at the blade tips when the valves are switched to this venting mode, thus bringing that particular tab to zero displacement. A high pressure opening at the valves connects the pneumatic lines to the atmospheric pressure at the valves, or inflation mode. A relatively high pressure can then be developed in either diaphragm when the valves controlling that particular diaphragm are switched to inflation mode. By controlling the valve modes—inflation, venting, or off—independently for the upper and lower diaphragms, specific upper and lower pneumatic trim tab angles or displacements can be achieved and held for the upper and lower tabs, which will be commanded by the trim tab control module.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A pneumatic actuated trim tab system adapted to be mounted on a rotor blade to pneumatically alter aerodynamic properties of the rotor blade, comprising:

at least one inflatable diaphragm adapted to be mounted on a surface of the rotor blade;

a deformable plate attached to each of said inflatable diaphragm, such that inflation and deflation of said inflatable diaphragm causes movement of each of said plate;

a valving system connected to each inflatable diaphragm to allow input of a fluid into each of said inflatable diaphragm and allow release of a fluid out each of said inflatable diaphragm;

a controller for controlling fluid pressure into and out of each of said inflatable diaphragm using said valving system.

2. The system of claim 1, wherein each of said inflatable diaphragm is adhered along a trailing edge of the rotor blade; wherein each of said plate is adhered to each of said inflatable diaphragm above the rotor blade; wherein each of said plate includes a forward section extending beyond each of said inflatable diaphragm and is adapted to be attached to the rotor blade.

3. The system of claim 1, further including a trim tab extending from the rotor blade which is a component of the rotor blade; wherein each of said inflatable diaphragm is adhered along the trim tab extending from the rotor blade; wherein each of said plate is adhered to each of said inflatable diaphragm above the rotor blade; wherein each of said plate includes a forward section extending beyond each of said inflatable diaphragm and is adapted to be attached to the rotor blade.

4. The system of claim 1, wherein each of said plate includes a forward section extending beyond each of said inflatable diaphragm and a rearward section extending beyond each of said inflatable diaphragm; wherein each of said forward section and rearward section are adapted to be attached to the rotor blade; wherein each of said inflatable diaphragm is trapped between each of said plate and the rotor blade; and wherein each of said inflatable diaphragm is between said forward section and said rearward section of each of said plate.

5. The system of claim 1, wherein there is an inflatable diaphragm with a plate on an upper surface of the rotor blade and an inflatable diaphragm with a plate on a lower surface of the rotor blade; wherein each of said plate includes a forward section extending beyond each of said inflatable diaphragm and a rearward section extending beyond each of said inflatable diaphragm; wherein each of said forward section is adapted to be attached to the rotor blade; wherein each of said inflatable diaphragm is adhered to a bottom surface of each of said plate between said forward section and said rearward section such that each of said inflatable diaphragm is trapped between each of said plate and the rotor blade; and wherein each of said rearward section of each of said plate extends beyond the rotor blade; wherein an end of said rearward section of each of said plate are connected together with the another end of said rearward section of each of said plate.

6. The system of claim 5, further including a flexible shear layer between said connected ends of each of said rearward section of each of said plate; and further including flexible ribs between said connected rearward sections of each of said plate.

7. The system of claim 6, where said ribs are stiff in compression and allow said plates to shear.

8. The system of claim 1, wherein each of said plate includes a forward section extending beyond each of said inflatable diaphragm and a rearward section extending beyond each of said inflatable diaphragm; wherein each of said forward section is adapted to be attached to the rotor blade; wherein each of said inflatable diaphragm is adhered to a bottom surface of each of said plate between said forward section and said rearward section such that each of said inflatable diaphragm is trapped between each of said plate and the rotor blade; and wherein each of said rearward section of each of said plate extends beyond the rotor blade; and wherein a rearward end of said rearward section includes an L-shape trailing edge to increase spanwise stiffness and spanwise displacement uniformity.

9. A pneumatic actuated trim tab system to be mounted on a rotor blade to pneumatically alter aerodynamic properties of the rotor blade, comprising:

a rotor blade having at least one plate recess and at least one diaphragm recess;

at least one inflatable diaphragm mounted on a surface said rotor blade in said diaphragm recess;

a deformable plate attached to each of said inflatable diaphragm, such that inflation and deflation of said inflatable diaphragm causes movement of each of said plate and said deformable plated is attached to said rotor blade in said plate recess;

a valving system connected to each inflatable diaphragm to allow input of a fluid into each of said inflatable diaphragm and allow release of a fluid out each of said inflatable diaphragm;

a controller for controlling fluid pressure into and out of each of said inflatable diaphragm using said valving system.

10. The system of claim 9, wherein there is an inflatable diaphragm with a plate on an upper surface of the rotor blade and an inflatable diaphragm with a plate on a lower surface of the rotor blade; wherein each of said plate includes a forward section extending beyond each of said inflatable diaphragm and a rearward section extending beyond each of said inflatable diaphragm; wherein each of said forward section is attached to said rotor blade in said plate recess; wherein each of said inflatable diaphragm is adhered to a bottom surface of each of said plate between said forward section and said rearward section such that each of said inflatable diaphragm is trapped between each of said plate and said diaphragm recess of said rotor blade; and wherein each of said rearward section of each of said plate extends beyond said rotor blade; wherein an end of said rearward section of each of said plate are connected together with the another end of said rearward section of each of said plate.

11. The system of claim 9, wherein each of said plate includes a forward section extending beyond each of said inflatable diaphragm and a rearward section extending beyond each of said inflatable diaphragm; wherein each of said forward section is attached to said rotor blade in said diaphragm recess; wherein each of said inflatable diaphragm is adhered to a bottom surface of each of said plate between said forward section and said rearward section such that each of said inflatable diaphragm is trapped between each of said plate and said plate recess of said rotor blade; and wherein each of said rearward section of each of said plate extends beyond said rotor blade; and wherein a rearward end of said rearward section includes an L-shape trailing edge to increase spanwise stiffness and spanwise displacement uniformity.

12. The system of claim 1, wherein said controller is a microprocessor controller adapted to be connected to at least one sensor on the rotor blade to obtain vibration sensor data and determine the optimal position of said plates sending control signals to said valving system to control fluid pressure into and out of each of said inflatable diaphragm.

13. The system of claim 1, further including a pneumatic channel system to provide a pneumatic link from said valving system to each of said inflatable diaphragm.

14. The system of claim 1, wherein said valving system is connected to a centrifugal air pumping system installed as part of the rotor blade is adapted to pump air to pressurize the valving system due to rotation of the rotor blade.

15. The system of claim 14, wherein said centrifugal air pumping system comprises:
at least one pneumatic line acting as a low pressure line connecting said valving system each of said inflation diaphragm, wherein said low pressure line spans from said valving system to a blade tip of the rotor blade to vent relatively higher pressure in each of said inflation diaphragm to a low dynamic pressure at the blade tip when the valving system is switched to a venting mode to deflate each of said inflation diaphragm; and
a high pressure opening at said valving system connecting said pneumatic lines to atmospheric pressure at said valving system for inflation of said inflation diaphragm, wherein a relatively high pressure is in said inflation diaphragm when said valving system controlling a particular diaphragm of said inflation diaphragm is inflated.

16. The system of claim 5, wherein said valving system is connected to a centrifugal air pumping system installed as part of the rotor blade is adapted to pump air to pressurize the valving system due to rotation of the rotor blade, wherein said centrifugal air pumping system comprises:
at least one pneumatic line acting as a low pressure line connecting said valving system each of said inflation diaphragm, wherein said low pressure line spans from said valving system to a blade tip of the rotor blade to vent relatively higher pressure in each of said inflation diaphragm to a low dynamic pressure at the blade tip when the valving system is switched to a venting mode to deflate each of said inflation diaphragm; and
a high pressure opening at said valving system connecting said pneumatic lines to atmospheric pressure at said valving system for inflation of said inflation diaphragm, wherein a relatively high pressure is in said inflation diaphragm when said valving system controlling a particular diaphragm of said inflation diaphragm is inflated.

17. A method of actuating pneumatic actuated trim tab system on a rotor blade, comprising:
using a controller for controlling fluid pressure into and out of inflatable diaphragms on each side of the rotor blade using a valving system connected to each inflatable diaphragm to allow input of a fluid into each of the inflatable diaphragm and allow release of a fluid out each of the inflatable diaphragm; and
inflating the proper inflatable diaphragm to move a deformable plate attached to each of the inflatable diaphragm, such that inflation and deflation of the inflatable diaphragm causes movement of each of the plate to alter aerodynamic properties of the rotor blade to mimic a trim tab on the rotor blade.

18. The method of claim 17, wherein said valving system is connected to a centrifugal air pumping system installed as part of the rotor blade to pump air to pressurize the valving system due to rotation of the rotor blade.

19. The method of claim 17, further using at least one pneumatic line acting as a low pressure line connecting the valving system each of the inflation diaphragm, wherein the low pressure line spans from the valving system to a blade tip of the rotor blade to vent relatively higher pressure in each of the inflation diaphragm to a low dynamic pressure at the blade tip when the valving system is switched to a venting mode to deflate each of the inflation diaphragm; and further using a high pressure opening at the valving system connecting the pneumatic lines to atmospheric pressure at the valving system for inflation of the inflation diaphragm, wherein a relatively high pressure is in the inflation diaphragm when the valving system controlling a particular diaphragm of the inflation diaphragm is inflated.

20. The method of claim 17, further including obtaining vibration sensor data from at least one sensor on the rotor blade; using the data to determine the optimal position of the plates; and sending control signals using the controller to the valving system to control fluid pressure into and out of each of the inflatable diaphragms to move the proper plate.

* * * * *